United States Patent
Chen et al.

(10) Patent No.: US 11,309,944 B2
(45) Date of Patent: Apr. 19, 2022

(54) METHOD AND DEVICE FOR ASSIGNING TRANSMISSION POWER

(71) Applicant: DATANG MOBILE COMMUNICATIONS EQUIPMENT CO., LTD, Beijing (CN)

(72) Inventors: Yuetan Chen, Beijing (CN); Xi Wang, Beijing (CN); Wenjing Wang, Beijing (CN); Shaoyuan Li, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 17/281,973

(22) PCT Filed: Oct. 15, 2019

(86) PCT No.: PCT/CN2019/111325
§ 371 (c)(1),
(2) Date: Mar. 31, 2021

(87) PCT Pub. No.: WO2020/088246
PCT Pub. Date: May 7, 2020

(65) Prior Publication Data
US 2021/0344387 A1 Nov. 4, 2021

(30) Foreign Application Priority Data

Oct. 30, 2018 (CN) .......................... 201811280788.0

(51) Int. Cl.
*H04B 7/0426* (2017.01)
*H04B 7/0452* (2017.01)
(Continued)

(52) U.S. Cl.
CPC ......... *H04B 7/0443* (2013.01); *H04B 7/0452* (2013.01); *H04B 7/0456* (2013.01);
(Continued)

(58) Field of Classification Search
CPC .... H04B 7/0426; H04B 7/043; H04B 7/0443; H04B 7/0452
(Continued)

(56) References Cited

U.S. PATENT DOCUMENTS 10,142,981 B2 *  11/2018  Yoshimura .......... H04W 72/042
2009/0279486 A1   11/2009  Kishigami et al.
(Continued)

FOREIGN PATENT DOCUMENTS

EP           3276846 A1     1/2018

*Primary Examiner* — John J Lee
(74) *Attorney, Agent, or Firm* — Bayramoglu Law Offices LLC (57) ABSTRACT

A method and device for allocating transmission powers, wherein the method and the device are applied to a base station. The method includes: acquiring channel data of terminals that are connected to the base station; according to the channel data of the terminals, from the terminals, virtually pre-dispatching first terminals of a first preset quantity; performing interference suppression to the first terminals, to obtain beamforming-weight-amplitude factors of the first terminals; dispatching second terminals of a second preset quantity from the first terminals, and, from the beamforming-weight-amplitude factors of the first terminals, screening out beamforming-weight-amplitude factors of the second terminals; and according to the beamforming-weight-amplitude factors of the second terminals, allocating transmission powers to the second terminals. The embodiments of the present application ensure that the frequency-deviation efficiency that is reported to the MAC layer of the base station has a smaller difference from that of the actual dispatching.

13 Claims, 2 Drawing Sheets

(51) Int. Cl.
*H04B 7/0456* (2017.01)
*H04B 7/06* (2006.01)
*H04B 7/08* (2006.01)
*H04J 11/00* (2006.01)
*H04W 52/14* (2009.01)
*H04W 52/24* (2009.01)
*H04W 52/34* (2009.01)
*H04W 52/36* (2009.01)
*H04W 52/42* (2009.01)

(52) U.S. Cl.
CPC ........... *H04B 7/0617* (2013.01); *H04B 7/086* (2013.01); *H04J 11/0023* (2013.01); *H04W 52/146* (2013.01); *H04W 52/243* (2013.01); *H04W 52/346* (2013.01); *H04W 52/362* (2013.01); *H04W 52/367* (2013.01); *H04W 52/42* (2013.01)

(58) Field of Classification Search
USPC ..... 455/501, 63.1, 67.13, 452.1, 452.2, 509, 455/522
See application file for complete search history.

(56) References Cited

U.S. PATENT DOCUMENTS

| | | | |
|---|---|---|---|
| 2014/0314006 A1* | 10/2014 | Suh | H04B 7/0452 370/329 |
| 2017/0230135 A1* | 8/2017 | Oh | H04J 11/00 |
| 2017/0272134 A1 | 9/2017 | Yuan et al. | |

* cited by examiner

METHOD AND DEVICE FOR ASSIGNING TRANSMISSION POWER

CROSS REFERENCE TO THE RELATED APPLICATIONS

This application is the national stage entry of International Application No. PCT/CN2019/111325, filed on Oct. 15, 2019, which is based upon and claims priority to Chinese Patent Application No. 201811280788.0, filed on Oct. 30, 2018, the entire contents of which are incorporated herein by reference.

TECHNICAL FIELD

The present application relates to the technical field of communication, and particularly relates to a method for allocating transmission powers and a device for allocating transmission powers.

BACKGROUND

In the current 4G (4th Generation) and 5G (5th Generation) communication systems, the technique of Massive MIMO is employed, which greatly enhances the performance of the downlink beamforming, and increases the overall throughput of the system. Moreover, in the technique of multi-user beamforming, the transmission power of each single user greatly influences the performance, and how to allocate the power directly influences the received signal-to-noise ratio and the jamming intensity between the users.

In order to increase the downlink capacity of the base station, it is required to, in the emitting, sufficiently utilize the spatial freedom caused by the Massive MIMO, by wavelength division multiplexing, by using the channel data provided by the modes such as SRS (Sounding Reference Signal) signal-channel estimation and CSI (Channel State Information) measurement feedback, by using the technique of beamforming, inhibit the interference between the users, and perform multi-user downlink emission in the same frequency band (for short MU-MIMO).

The modes of generating the beamforming weight (which may also be referred to as precode) used by the MU-MIMO are diverse. The theoretical derivation generally does not take into consideration the conditions of power constraint. Therefore, allocating the same transmission power to each of the users and ensuring that the total power is constant is a commonly used mode of power allocation.

However, because of the power limitation of a single radio-frequency channel, after the beamforming weight has been generated, in order to prevent the channel power from getting too high or too low, generally the transmission powers of each of the radio-frequency channels are calculated within the range of the granularity of the beamforming bandwidth, the power of the channel having the highest power is amplified to the rated power of the radio-frequency channels, and the powers of the other channels are amplified at an equal proportion. That cannot only utilize the power of the radio-frequency channels to the utmost extent, but can also ensure that the beamforming weight of each of the radio-frequency channels of each of the users maintains the original relative amplitude and phase relation.

However, the above prior art still has the following disadvantages:

(1) The power is evenly allocated between the users, which is not optimum in term of the overall channel capacity.

(2) The conditions of the channels of each of the users are different, but the modulation level of the system has an upper limit. Probably certain users at a superexcellent point can reach the peak speed with merely a very small power, and the even allocation of the power causes the power waste at those users.

(3) The granularities of each of the beamforming bandwidths individually undergo power adjustment, and the total bandwidth that is actually dispatched is not taken into consideration. Although that ensures that the power does not exceed power limitation, the channel power is not utilized to the utmost extent.

(4) Beamforming results in that the power of the terminal PDSCH (Physical Downlink Shared Channel) is far greater than the powers of common reference signals such as CRS (CSI Reference Signal), and therefore that adversely affects the measurement and detection of the terminals. The prior art has not pertinently introduced the restriction on the beamforming gain.

(5) Virtual pre-dispatching and the real dispatching might have differences in the time points, which results in that the real dispatched user is not consistent with that of the virtual pre-dispatching. Therefore, the user equivalent SNR (Signal-to-Noise Ratio) and the spectrum efficiency that are calculated in virtual pre-dispatching in the prior art are highly different from the actual situations, which negatively affects the dispatching selection of the MAC (Media Access Control Layer).

SUMMARY

In view of the above problems, the embodiments of the present application provide a method for allocating transmission powers and correspondingly a device for allocating transmission powers.

In order to solve the above problems, an embodiment of the present application discloses a method for allocating transmission powers, the method being applied to a base station, wherein the method comprises:

acquiring channel data of terminals that are connected to the base station;

according to the channel data of the terminals, from the terminals, virtually pre-dispatching first terminals of a first preset quantity;

performing interference suppression to the first terminals, to obtain beamforming-weight-amplitude factors of the first terminals;

dispatching second terminals of a second preset quantity from the first terminals, and, from the beamforming-weight-amplitude factors of the first terminals, screening out beamforming-weight-amplitude factors of the second terminals; and according to the beamforming-weight-amplitude factors of the second terminals, allocating transmission powers to the second terminals.

Preferably, the base station is provided with a power pool; and the step of performing the interference suppression to the first terminals, to obtain the beamforming-weight-amplitude factors of the first terminals comprises:

performing interference suppression to the first terminals, to obtain beamforming weights of the first terminals;

by using the beamforming weights of the first terminals, calculating out a pre-allocated power of the first terminals; and based on the pre-allocated powers of the first terminals and a maximum capacity of the power pool, calculating out the beamforming-weight-amplitude factors of the first terminals.

Preferably, the step of, by using the beamforming weights of the first terminals, calculating out the pre-allocated power of the first terminals comprises:

by using the beamforming weights of the first terminals, calculating out a first power difference between the first terminals and a preset spectrum-efficiency upper limit and a second power difference between the first terminals and a preset beamforming-gain upper limit;

if the first power difference is greater than the second power difference, using the second power difference as the pre-allocated power of the first terminals;

if the first power difference is less than the second power difference, using the first power difference as the pre-allocated power of the first terminals; and if the first power difference is equal to the second power difference, using the first power difference or the second power difference as the pre-allocated power of the first terminals.

Preferably, the step of, according to the channel data of the terminals, from the terminals, virtually pre-dispatching the first terminals of the first preset quantity comprises:

calculating similarities of the channel data of the terminals; and acquiring terminals of the first preset quantity having minimum similarities as the first terminals.

Preferably, the step of, according to the beamforming-weight-amplitude factors of the second terminals, allocating the transmission powers to the second terminals comprises:

performing interference suppression to the second terminals, to obtain beamforming weights of the second terminals;

multiplying the beamforming weights of the second terminals by the beamforming-weight-amplitude factors of the second terminals, to obtain final beamforming weights of the second terminals;

by using the final beamforming weights of the second terminals, calculating out target transmission powers of the second terminals; and adjusting current transmission powers of the second terminals to the target transmission powers.

Preferably, the step of adjusting the current transmission powers of the second terminals to the target transmission powers comprises:

acquiring a maximum-power channel that has a maximum transmission power in the target transmission powers of the second terminals;

judging whether a transmission power of the maximum-power channel exceeds a channel-transmission-power upper limit;

if yes, reducing the transmission powers of all of the channels of the second terminals at an equal proportion, till the transmission power of the maximum-power channel is not greater than the channel-transmission-power upper limit, and, simultaneously, reducing the maximum capacity of the power pool by a step length; and if no, increasing the maximum capacity of the power pool by a step length.

Correspondingly, an embodiment of the present application discloses a device for allocating transmission powers, the device being applied to a base station, wherein the device comprises:

an acquiring module configured for acquiring channel data of terminals that are connected to the base station;

a virtual-pre-dispatching module configured for, according to the channel data of the terminals, from the terminals, virtually pre-dispatching first terminals of a first preset quantity;

an interference-suppression module configured for performing interference suppression to the first terminals, to obtain beamforming-weight-amplitude factors of the first terminals;

a dispatching module configured for dispatching second terminals of a second preset quantity from the first terminals, and, from the beamforming-weight-amplitude factors of the first terminals, screening out beamforming-weight-amplitude factors of the second terminals; and a transmission-power allocating module configured for, according to the beamforming-weight-amplitude factors of the second terminals, allocating transmission powers to the second terminals.

Preferably, the base station is provided with a power pool; and the interference-suppression module comprises:

a first beamforming-weight acquiring submodule configured for performing interference suppression to the first terminals, to obtain beamforming weights of the first terminals;

a pre-allocated-power calculating submodule configured for, by using the beamforming weights of the first terminals, calculating out a pre-allocated power of the first terminals; and a beamforming-weight-amplitude-factor calculating submodule configured for, based on the pre-allocated powers of the first terminals and a maximum capacity of the power pool, calculating out the beamforming-weight-amplitude factors of the first terminals.

Preferably, the pre-allocated-power calculating submodule comprises:

a calculating unit configured for, by using the beamforming weights of the first terminals, calculating out a first power difference between the first terminals and a preset spectrum-efficiency upper limit and a second power difference between the first terminals and a preset beamforming-gain upper limit;

a first determining unit configured for, if the first power difference is greater than the second power difference, using the second power difference as the pre-allocated power of the first terminals;

a second determining unit configured for, if the first power difference is less than the second power difference, using the first power difference as the pre-allocated power of the first terminals; and a third determining unit configured for, if the first power difference is equal to the second power difference, using the first power difference or the second power difference as the pre-allocated power of the first terminals.

Preferably, the virtual-pre-dispatching module comprises:

a similarity calculating submodule configured for calculating similarities of the channel data of the terminals; and a first-terminal determining submodule configured for acquiring terminals of the first preset quantity having minimum similarities as the first terminals.

Preferably, the transmission-power allocating module comprises:

a second beamforming-weight acquiring submodule configured for performing interference suppression to the second terminals, to obtain beamforming weights of the second terminals;

a third beamforming-weight acquiring submodule configured for multiplying the beamforming weights of the second terminals by the beamforming-weight-amplitude factors of the second terminals, to obtain final beamforming weights of the second terminals;

a transmission-power calculating submodule configured for, by using the final beamforming weights of the second terminals, calculating out target transmission powers of the second terminals; and a transmission-power adjusting submodule configured for adjusting current transmission powers of the second terminals to the target transmission powers.

Preferably, the transmission-power adjusting submodule comprises:

a maximum-power-channel acquiring unit configured for acquiring a maximum-power channel that has a maximum transmission power in the target transmission powers of the second terminals;

a channel-transmission-power-upper-limit judging unit configured for judging whether a transmission power of the maximum-power channel exceeds a channel-transmission-power upper limit;

a first power-pool-capacity adjusting module configured for reducing the transmission powers of all of the channels of the second terminals at an equal proportion, till the transmission power of the maximum-power channel is not greater than the channel-transmission-power upper limit, and, simultaneously, reducing the maximum capacity of the power pool by a step length; and a second power-pool-capacity adjusting module configured for increasing the maximum capacity of the power pool by a step length.

The embodiments of the present application have the following advantages:

In the embodiments of the present application, the base station firstly acquires channel data of the terminals that are connected to it; subsequently according to the channel data of the terminals, from the terminals, virtually pre-dispatch out first terminals of a first preset quantity; subsequently perform interference suppression to the first terminals, to obtain beamforming-weight-amplitude factors of the first terminals; subsequently dispatch out second terminals of a second preset quantity from the first terminals, and, from the beamforming-weight-amplitude factors of the first terminals, screen out beamforming-weight-amplitude factors of the second terminals; and, finally, according to the beamforming-weight-amplitude factors of the second terminals, allocate transmission powers to the second terminals. In the embodiments of the present application, the concept of virtual preset adjustment is introduced into the power allocation, wherein the allocated powers and the beamforming-weight-amplitude factors of each of the terminals are determined in the virtual pre-dispatching, and are used for the interference suppression in the real dispatching, to obtain the final transmission powers of the terminals. Accordingly, that ensures that the frequency-deviation efficiency that is reported to the MAC layer of the base station has a smaller difference from that of the actual dispatching, which facilitates the stability and accuracy of the dispatching of the MAC layer.

In addition, in the embodiments of the present application, the concept of power pool is introduced into the power allocation, wherein the classic principle of power water filling is used as the basic principle, and, on that basis, limitations such as the spectrum-efficiency upper limit and the beamforming-gain upper limit are added, to perform the allocating of the power. Considering the differences between the virtual pre-dispatching and the actual dispatching, the beamforming-weight-amplitude factors of each of the terminals are determined in the virtual pre-dispatching, to reduce to the greatest extent the differences between the terminal equivalent SNRs calculated in the virtual pre-dispatching and the real dispatching. When the power limitations of single channels are considered, all of the transmitted signals within the bandwidth range of the real dispatching are taken into consideration, to calculate the powers of each of the channels, simultaneously the power adjustment factors that are calculated at the moment are fed back, and accordingly the size of the power pool in the theme of power allocation is dynamically adjusted, to utilize the power sufficiently to the largest extent, and at the same time ensure the stability of the overall system. Furthermore, in the embodiments of the present application, the size of the power pool is dynamically adjusted by using the mechanism of feedback, which utilizes the channel power to the largest extent and enhances the robustness of the theme, to enable it to be applicable to many scenes.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art can obtain other figures according to these figures without paying creative work.

DETAILED DESCRIPTION OF THE EMBODIMENTS

In order to make the above purposes, features and advantages of the present application more apparent and understandable, the present application will be described in further detail below with reference to the drawings and the particular embodiments. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
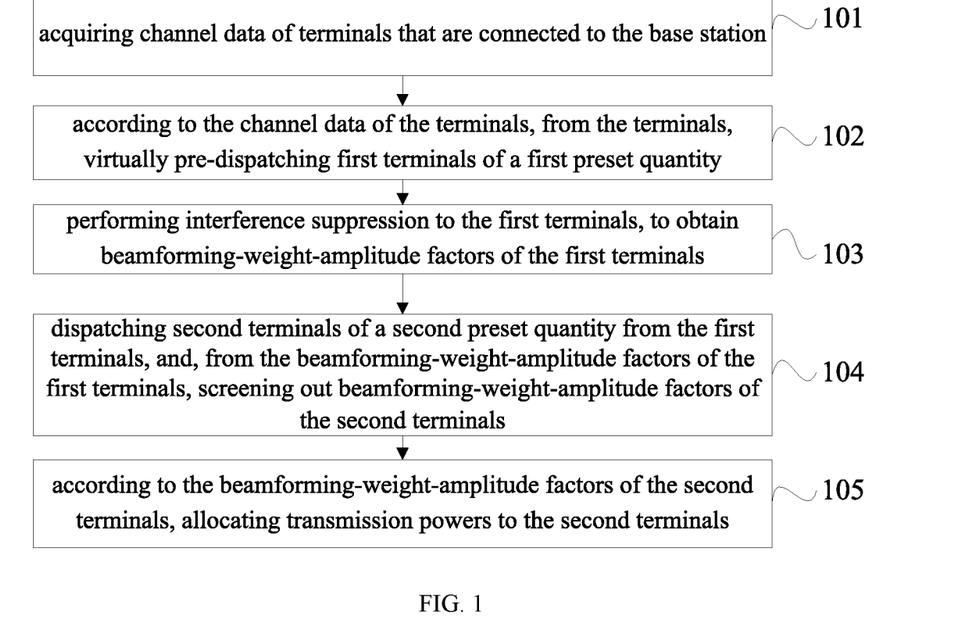
FIG. 1 is a flow chart of the steps of an embodiment of the method for allocating transmission powers according to the present application.

Referring to FIG. 1, FIG. 1 shows a flow chart of the steps of an embodiment of the method for allocating transmission powers according to the present application, the method being applied to a base station. The method may particularly comprise the following steps:

Step 101: acquiring channel data of terminals that are connected to the base station.

In practical applications, the wireless area that is controlled by a base station is referred to as a cell. In LTE (Long Term Evolution), one base station can control a plurality of cells, wherein different cells have different cell IDs (identification). In an embodiment of the present application, the channel data of the terminals within one cell that is controlled by a base station may be acquired, or the channel data of the terminals within all of the cells that are controlled by the base station may be acquired, which may be particularly adjusted according to practical demands. In order to facilitate the description, in the present application the detailed description is based on one cell.

The channel refers to a channel of communication, and is the medium of signal transmission. In an embodiment of the present application, the channel data may comprise the identifier, the frequency-domain response, the channel quality, and so on, of a channel.

Step 102: according to the channel data of the terminals, from the terminals, virtually pre-dispatching first terminals of a first preset quantity.

In LTE, the dispatching refers to how to allocate the wireless resource PRBs (physical resource block). Generally speaking, it means what terminals the base station allocates the PRBs to, how many PRBs those terminals are allocated, and so on.

In an embodiment of the present application, before the base station performs the real dispatching to the terminals, the base station performs pre-dispatching one time. In a preferable embodiment of the present application, the step of, according to the channel data of the terminals, from the terminals, virtually pre-dispatching the first terminals of the first preset quantity comprises:

calculating similarities of the channel data of the terminals; and acquiring terminals of the first preset quantity having minimum similarities as the first terminals.

Particularly, the background administrator presets the quantity of the terminals that are to be pre-dispatched, for example, 20 terminals. Therefore, after the channel data of the terminals have been acquired, firstly it is judged whether the sum of the terminals that are acquired is greater than the first preset quantity. If the sum of the terminals that are acquired is greater than the first preset quantity, further, the similarities of the channel data of the terminals are calculated, and then the terminals of the first preset quantity having the minimum similarities are used as the first terminals. For example, if the channel data of 50 terminals are acquired and the first preset quantity is 20, then the similarities of the channel data of the 50 terminals are individually calculated, and then the first 20 terminals that have the minimum similarities are used as the first terminals.

If the sum of the terminals that are acquired is less than the first preset quantity, then it is not required to calculate the channel data of the terminals, and all of the terminals are used as the first terminals. For example, if the channel data of 88 terminals are acquired and the first preset quantity is 100, then it is not required to calculate the similarities of the channel data of the 88 terminals, and all of the 88 terminals are directly used as the first terminals.

Step 103: performing interference suppression to the first terminals, to obtain beamforming-weight-amplitude factors of the first terminals.

The interference refers to the interference by a garbage signal of the same frequency to the receiver, which is referred to as co-channel interference, and may also be referred to as same-frequency interference or same-channel interference.

In mobile communication, in order to increase the spectrum utilization, co-channel stations that have a certain distance therebetween are used, which is referred to as co-channel multiplexing. If the co-channel wireless areas are distanced further, their isolation higher, and the co-channel interference is smaller, but the spectrum utilization is reduced. Therefore, in the frequency distribution of wireless clusters, the minimum distance of the replicated usage of the same frequency should be determined on the premise that a certain communication quality is ensured.

However, the interference suppression refers to reducing the interference between channels by using an algorithm. Although the interference suppression can reduce the interference between the channels, if the interference is higher, it is more difficult to inhibit it, and the interference suppression might even damage the original signal. Therefore, in an embodiment of the present application, in pre-dispatching, the terminals that have the lower similarities of the channel data are selected.

In a preferable embodiment of the present application, the base station is provided with a power pool; and the step of performing the interference suppression to the first terminals, to obtain the beamforming-weight-amplitude factors of the first terminals comprises:

performing interference suppression to the first terminals, to obtain beamforming weights of the first terminals;

by using the beamforming weights of the first terminals, calculating out a pre-allocated power of the first terminals; and based on the pre-allocated powers of the first terminals and a maximum capacity of the power pool, calculating out the beamforming-weight-amplitude factors of the first terminals.

Particularly, the base station may be provided with a power pool. The power pool reflects the maximum values of the power sums of the terminals that the base station can dispatch. The administrator may, at the initialization, set a preset value of the size of the power pool according to actual situations. In order to prevent the preset value from being greater than the actual load capacity of the base station to result in communication failure, or prevent the preset value from being less than the actual load capacity of the base station to result in a poor communication efficiency, in practical applications, dynamic adjustment is performed according to the feedback of the base station in operation.

In virtual pre-dispatching, the process comprises performing interference suppression to the first terminals that are virtually dispatched, firstly obtaining the beamforming weights of the first terminals, then generating the beamforming weights after power normalization, at this point estimating, under the normalized beamforming weights, the received SINRs (Signal to Interference plus Noise Ratio) and the beamforming gains of the terminals, accordingly calculating individually the powers that are required to be allocated to reach the spectrum-efficiency upper limit and reach the beamforming-gain upper limit, and using the smaller one of the two values as the upper limit of the allocated power of the terminals, i.e., the pre-allocated power.

The spectrum-efficiency upper limit refers to the spectrum efficiency that corresponds to the highest MCS (Modulation and Coding Scheme) that is stipulated in the protocol, and is required to be simulated to reach the detected SNR (Signal-to-Noise Ratio) that is required by the highest MCS level. The beamforming gain refers to, comparing the actual beamforming weight and the broadcast beamforming weight, the received signal-to-noise ratio gain that is brought to the terminal, and requires self-defining according to actual test results.

The step of, by using the beamforming weights of the first terminals, calculating out the pre-allocated power of the first terminals comprises:

by using the beamforming weights of the first terminals, calculating out a first power difference between the first terminals and a preset spectrum-efficiency upper limit and a second power difference between the first terminals and a preset beamforming-gain upper limit;

if the first power difference is greater than the second power difference, using the second power difference as the pre-allocated power of the first terminals;

if the first power difference is less than the second power difference, using the first power difference as the pre-allocated power of the first terminals; and if the first power difference is equal to the second power difference, using the first power difference or the second power difference as the pre-allocated power of the first terminals.

The process comprises, in power allocation, by using the principle of water filling, under the limitations by the power pool, adding into the terminals one by one for the iteration, and calculating the powers that are required to be allocated to the terminals at the maximum capacity (the maximum capacity of the power pool); once the power of a certain terminal exceeds its upper limit of allocated power, fixing the power of that terminal as the upper limit of allocated power, removing that terminal from the terminal set, subtracting the power allocated to that terminal from the power pool, and then performing the iteration of the power-water-filling algorithm; and, finally, according to the powers allocated to the terminals, calculating the amplitude factors of the beamforming weights of the terminals, calculating the spectrum efficiencies of the users, and reporting to the MAC (media access control layer) layer. The amplitude factors of the beamforming weights are parameters for measuring the magnitudes of the allocated powers.

Step 104: dispatching second terminals of a second preset quantity from the first terminals, and, from the beamforming-weight-amplitude factors of the first terminals, screening out beamforming-weight-amplitude factors of the second terminals.

After the pre-allocated powers of the first terminals have been obtained by the calculation, some or all of the first terminals may be really dispatched. In an embodiment of the present application, the administrator may preset the quantity of the terminals that are directly really dispatched. For example, if the quantity of the first terminals is 10 and the second preset quantity is 8, then 8 terminals are selected from those 10 terminals as the second terminals, wherein the condition of the selection is also the similarities of the channels. After the second terminals have been selected out, correspondingly, the beamforming-weight-amplitude factors that correspond to the second terminals are also selected out.

Certainly, if the second preset quantity is greater than the quantity of the first terminals, then all of the first terminals serve as the second terminals.

Step 105: according to the beamforming-weight-amplitude factors of the second terminals, allocating transmission powers to the second terminals.

In a preferable embodiment of the present application, the step of, according to the beamforming-weight-amplitude factors of the second terminals, allocating the transmission powers to the second terminals comprises:

performing interference suppression to the second terminals, to obtain beamforming weights of the second terminals;

multiplying the beamforming weights of the second terminals by the beamforming-weight-amplitude factors of the second terminals, to obtain final beamforming weights of the second terminals;

by using the final beamforming weights of the second terminals, calculating out target transmission powers of the second terminals; and adjusting current transmission powers of the second terminals to the target transmission powers.

Particularly, the process comprises performing interference suppression to the second terminals, to obtain the beamforming weight of each of the second terminals, performing power normalization, and multiplying the beamforming-weight-amplitude factors of the terminals that are obtained by the calculation in the virtual pre-dispatching, as the final beamforming weights of the second terminals.

The step of adjusting the current transmission powers of the second terminals to the target transmission powers comprises:

acquiring a maximum-power channel that has a maximum transmission power in the target transmission powers of the second terminals;

judging whether a transmission power of the maximum-power channel exceeds a channel-transmission-power upper limit;

if yes, reducing the transmission powers of all of the channels of the second terminals at an equal proportion, till the transmission power of the maximum-power channel is not greater than the channel-transmission-power upper limit, and, simultaneously, reducing the maximum capacity of the power pool by a step length; and if no, increasing the maximum capacity of the power pool by a step length.

In an aspect, after the beamforming weights of all of the terminals have been obtained, it is required to calculate the average power of each of the channels at full bandwidth, find the channel having the largest power, and feed back its power value to the base station. If the maximum power exceeds the single-channel power limitation, the powers of all of the channels are reduced at an equal proportion, to ensure that no overpower happens. If the maximum power does not exceed the single-channel power limitation, no power adjustment is performed, to ensure that the powers that are allocated in the actual dispatching and in the virtual pre-dispatching are the same.

In another aspect, the base station, according to the highest channel power that is fed back, adjusts the size of the power pool by using a certain step length. When the fed-back power exceeds the single-channel-power upper limit, the power pool is reduced according to the step length. When the fed-back power is less than the single-channel-power upper limit, the power pool is increased according to the step length. The adjustment according to the step length refers to regulating stepwise. For example, if the power pool is initially set to be 10 DB, then increasing according to the step length of 1 DB means adjusting sequentially to 11 DB, 12 DB and 13 DB, and the rest can be done in the same manner.

In the embodiments of the present application, the base station firstly acquires channel data of the terminals that are connected to it; subsequently according to the channel data of the terminals, from the terminals, virtually pre-dispatch out first terminals of a first preset quantity; subsequently perform interference suppression to the first terminals, to obtain beamforming-weight-amplitude factors of the first terminals; subsequently dispatch out second terminals of a second preset quantity from the first terminals, and, from the beamforming-weight-amplitude factors of the first terminals, screen out beamforming-weight-amplitude factors of the second terminals; and, finally, according to the beamforming-weight-amplitude factors of the second terminals, allocate transmission powers to the second terminals. In the embodiments of the present application, the concept of virtual preset adjustment is introduced into the power allocation, wherein the allocated powers and the beamforming-weight-amplitude factors of each of the terminals are determined in the virtual pre-dispatching, and are used for the interference suppression in the real dispatching, to obtain the final transmission powers of the terminals. Accordingly, that ensures that the frequency-deviation efficiency that is reported to the MAC layer of the base station has a smaller difference from that of the actual dispatching, which facilitates the stability and accuracy of the dispatching of the MAC layer.

It should be noted that, regarding the process embodiments, for brevity of the description, all of them are expressed as the combination of a series of actions, but a person skilled in the art should know that the embodiments of the present application are not limited by the sequences of the actions that are described, because according to the embodiments of the present application, some of the steps may have other sequences or be performed simultaneously. Secondly, a person skilled in the art should also know that all of the embodiments described in the description are preferable embodiments, and not all of the actions that they involve are required by the embodiments of the present application.

Figure 2:
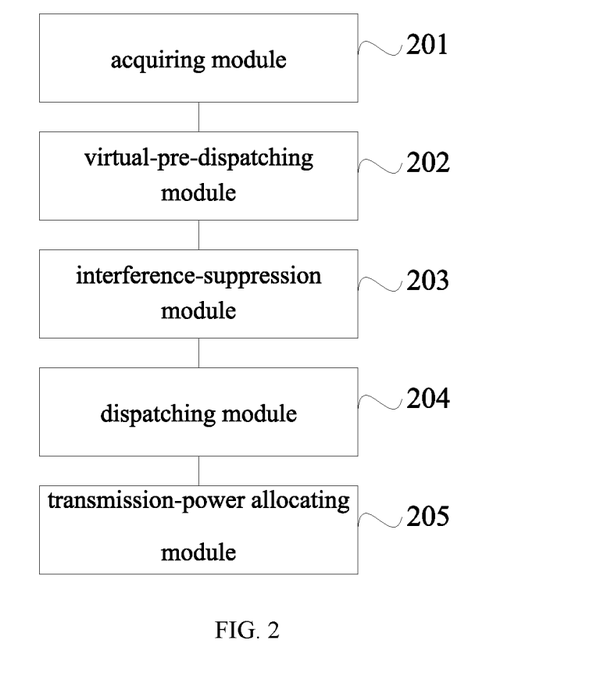
FIG. 2 is a structural block diagram of an embodiment of the device for allocating transmission powers according to the present application.

Referring to FIG. 2, FIG. 2 shows a structural block diagram of an embodiment of the device for allocating transmission powers according to the present application, the device being applied to a base station. The device may particularly comprise the following modules:

an acquiring module 201 configured for acquiring channel data of terminals that are connected to the base station;

a virtual-pre-dispatching module 202 configured for, according to the channel data of the terminals, from the terminals, virtually pre-dispatching first terminals of a first preset quantity;

an interference-suppression module 203 configured for performing interference suppression to the first terminals, to obtain beamforming-weight-amplitude factors of the first terminals;

a dispatching module 204 configured for dispatching second terminals of a second preset quantity from the first terminals, and, from the beamforming-weight-amplitude factors of the first terminals, screening out beamforming-weight-amplitude factors of the second terminals; and a transmission-power allocating module 205 configured for, according to the beamforming-weight-amplitude factors of the second terminals, allocating transmission powers to the second terminals.

In a preferable embodiment of the present application, the base station is provided with a power pool; and the interference-suppression module comprises:

a first beamforming-weight acquiring submodule configured for performing interference suppression to the first terminals, to obtain beamforming weights of the first terminals;

a pre-allocated-power calculating submodule configured for, by using the beamforming weights of the first terminals, calculating out a pre-allocated power of the first terminals; and a beamforming-weight-amplitude-factor calculating submodule configured for, based on the pre-allocated powers of the first terminals and a maximum capacity of the power pool, calculating out the beamforming-weight-amplitude factors of the first terminals.

In a preferable embodiment of the present application, the pre-allocated-power calculating submodule comprises:

a calculating unit configured for, by using the beamforming weights of the first terminals, calculating out a first power difference between the first terminals and a preset spectrum-efficiency upper limit and a second power difference between the first terminals and a preset beamforming-gain upper limit;

a first determining unit configured for, if the first power difference is greater than the second power difference, using the second power difference as the pre-allocated power of the first terminals;

a second determining unit configured for, if the first power difference is less than the second power difference, using the first power difference as the pre-allocated power of the first terminals; and a third determining unit configured for, if the first power difference is equal to the second power difference, using the first power difference or the second power difference as the pre-allocated power of the first terminals.

In a preferable embodiment of the present application, the virtual-pre-dispatching module comprises:

a similarity calculating submodule configured for calculating similarities of the channel data of the terminals; and a first-terminal determining submodule configured for acquiring terminals of the first preset quantity having minimum similarities as the first terminals.

In a preferable embodiment of the present application, the transmission-power allocating module comprises:

a second beamforming-weight acquiring submodule configured for performing interference suppression to the second terminals, to obtain beamforming weights of the second terminals;

a third beamforming-weight acquiring submodule configured for multiplying the beamforming weights of the second terminals by the beamforming-weight-amplitude factors of the second terminals, to obtain final beamforming weights of the second terminals;

a transmission-power calculating submodule configured for, by using the final beamforming weights of the second terminals, calculating out target transmission powers of the second terminals; and a transmission-power adjusting submodule configured for adjusting current transmission powers of the second terminals to the target transmission powers.

In a preferable embodiment of the present application, the transmission-power adjusting submodule comprises:

a maximum-power-channel acquiring unit configured for acquiring a maximum-power channel that has a maximum transmission power in the target transmission powers of the second terminals;

a channel-transmission-power-upper-limit judging unit configured for judging whether a transmission power of the maximum-power channel exceeds a channel-transmission-power upper limit;

a first power-pool-capacity adjusting module configured for reducing the transmission powers of all of the channels of the second terminals at an equal proportion, till the transmission power of the maximum-power channel is not greater than the channel-transmission-power upper limit, and, simultaneously, reducing the maximum capacity of the power pool by a step length; and a second power-pool-capacity adjusting module configured for increasing the maximum capacity of the power pool by a step length.

Regarding the device embodiments, because they are substantially similar to the process embodiments, they are described simply, and the related parts may refer to the description on the process embodiments.

The embodiments of the description are described in the mode of progression, each of the embodiments emphatically describes the differences from the other embodiments, and the same or similar parts of the embodiments may refer to each other.

A person skilled in the art should understand that the embodiments of the present application may be provided as a method, a device, or a computer program product. Therefore, the embodiments of the present application may take the form of a complete hardware embodiment, a complete software embodiment, or an embodiment combining software and hardware. Furthermore, the embodiments of the present application may take the form of a computer program product implemented on one or more computer-usable storage media (including but not limited to a disk storage, a CD-ROM, an optical memory and so on) containing a computer-usable program code therein.

The embodiments of the present application are described with reference to the flow charts and/or block diagrams of the method, the terminal device (system), and the computer program product according to the embodiments of the present application. It should be understood that each flow and/or block in the flow charts and/or block diagrams, and combinations of the flows and/or blocks in the flow charts and/or block diagrams, may be implemented by a computer program instruction. The computer program instructions may be provided to a processor of a general-purpose computer, a special-purpose computer, an embedded processor, or another programmable data processing terminal device to generate a machine, so that a device for implementing the functions specified in one or more flows of the flow charts and/or one or more blocks of the block diagrams can be generated by instructions executed by the processor of the computers or the other programmable data processing terminal device.

The computer program instructions may also be stored in a computer-readable memory that can instruct the computers or the other programmable data processing terminal device to operate in a specific mode, so that the instructions stored in the computer-readable memory generate an article comprising an instruction device, and the instruction device implements the functions specified in one or more flows of the flow charts and/or one or more blocks of the block diagrams.

The computer program instructions may also be loaded to the computers or the other programmable data processing terminal device, so that the computers or the other programmable data processing terminal device implement a series of operation steps to generate the computer-implemented processes, whereby the instructions executed in the computers or the other programmable data processing terminal device provide the steps for implementing the functions specified in one or more flows of the flow charts and/or one or more blocks of the block diagrams.

Although preferable embodiments of the embodiments of the present application have been described, once a person skilled in the art has known the substantial inventive concept, he may make further variations and modifications on those embodiments. Therefore, the appended claims are intended to be interpreted as including the preferable embodiments and all of the variations and modifications that fall within the scope of the embodiments of the present application.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording "comprising a . . . " does not exclude additional same element in the process, method, article or terminal device comprising the element.

The method for allocating transmission powers and the device for allocating transmission powers according to the present application have been described in detail above. The principle and the embodiments of the present application are described herein with reference to the particular examples, and the description of the above embodiments is merely intended to facilitate to understand the method according to the present application and its core concept. Moreover, for a person skilled in the art, according to the concept of the present application, the particular embodiments and the range of application may be varied. In conclusion, the contents of the description should not be understood as limiting the present application.

The above-described device embodiments are merely illustrative, wherein the units that are described as separate components may or may not be physically separate, and the components that are displayed as units may or may not be physical units; in other words, they may be located at the same one location, and may also be allocated to a plurality of network units. Part or all of the modules may be selected according to the actual demands to realize the purposes of the solutions of the embodiments. A person skilled in the art can understand and implement the technical solutions without paying creative work.

Each component embodiment of the present application may be implemented by hardware, or by software modules that are operated on one or more processors, or by a combination thereof. A person skilled in the art should understand that some or all of the functions of some or all of the components of the calculating and processing device according to the embodiments of the present application may be implemented by using a microprocessor or a digital signal processor (DSP) in practice. The present application may also be implemented as apparatus or device programs (for example, computer programs and computer program products) for implementing part of or the whole of the method described herein. Such programs for implementing the present application may be stored in a computer-readable medium, or may be in the form of one or more signals. Such signals may be downloaded from an Internet website, or provided on a carrier signal, or provided in any other forms.

Figure 3:
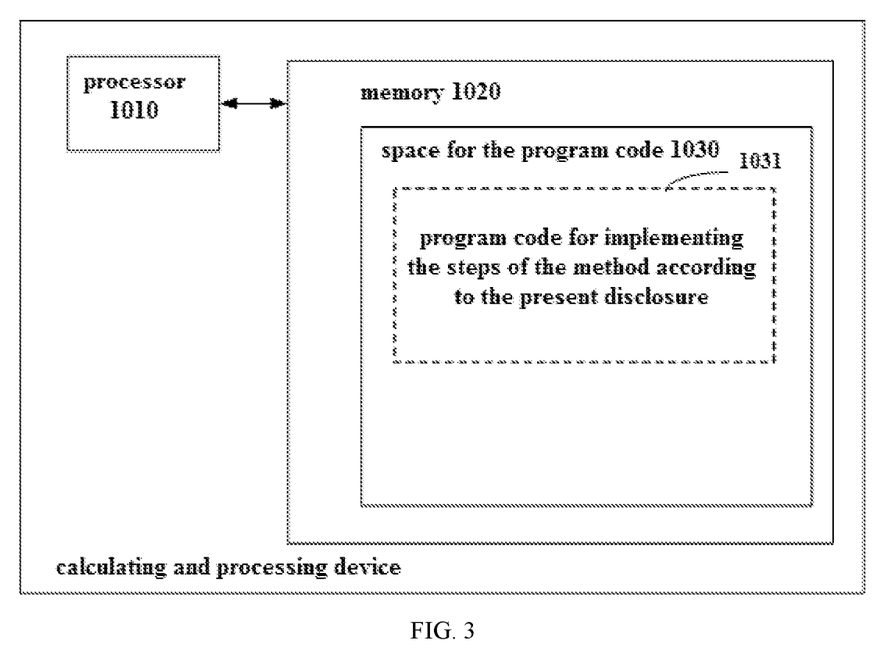
FIG. 3 schematically shows a block diagram of a calculating and processing device for implementing the method according to the present application.
Figure 4:
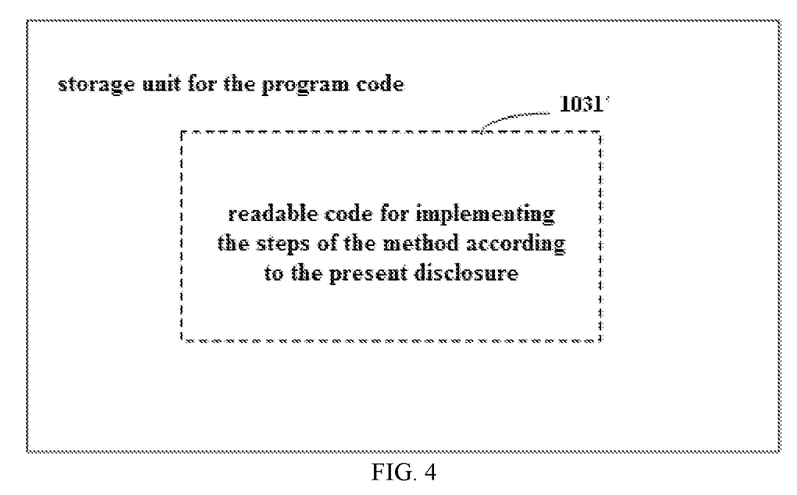
FIG. 4 schematically shows a storage unit for maintaining or carrying a program code for implementing the method according to the present application.

For example, FIG. 3 shows a calculating and processing device that can implement the method according to the present application. The calculating and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1031 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk as shown in FIG. 4. Such computer program products are usually portable or fixed storage units. The storage unit may have storage segments or storage spaces with similar arrangement to the memory 1020 of the calculating and processing device in FIG. 3. The program codes may for example be compressed in a suitable form. Generally, the storage unit contains a computer-readable code 1031', which can be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present application, and not to limit them. Although the present application is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A method for allocating transmission powers, the method being applied to a base station, wherein the method comprises:
    acquiring channel data of terminals that are connected to the base station;
    according to the channel data of the terminals, from the terminals, virtually pre-dispatching first terminals of a first preset quantity;
    performing interference suppression to the first terminals, to obtain beamforming-weight-amplitude factors of the first terminals;
    dispatching second terminals of a second preset quantity from the first terminals, and, from the beamforming-weight-amplitude factors of the first terminals, screening out beamforming-weight-amplitude factors of the second terminals; and
    according to the beamforming-weight-amplitude factors of the second terminals, allocating transmission powers to the second terminals.

2. The method according to claim 1, wherein the base station is provided with a power pool; and
    the step of performing the interference suppression to the first terminals, to obtain the beamforming-weight-amplitude factors of the first terminals comprises:
    performing interference suppression to the first terminals, to obtain beamforming weights of the first terminals;
    by using the beamforming weights of the first terminals, calculating out a pre-allocated power of the first terminals; and
    based on the pre-allocated powers of the first terminals and a maximum capacity of the power pool, calculating out the beamforming-weight-amplitude factors of the first terminals.

3. The method according to claim 2, wherein the step of, by using the beamforming weights of the first terminals, calculating out the pre-allocated power of the first terminals comprises:
    by using the beamforming weights of the first terminals, calculating out a first power difference between the first terminals and a preset spectrum-efficiency upper limit and a second power difference between the first terminals and a preset beamforming-gain upper limit;
    if the first power difference is greater than the second power difference, using the second power difference as the pre-allocated power of the first terminals;
    if the first power difference is less than the second power difference, using the first power difference as the pre-allocated power of the first terminals; and
    if the first power difference is equal to the second power difference, using the first power difference or the second power difference as the pre-allocated power of the first terminals.

4. The method according to claim 1, wherein the step of, according to the channel data of the terminals, from the terminals, virtually pre-dispatching the first terminals of the first preset quantity comprises:
    calculating similarities of the channel data of the terminals; and
    acquiring terminals of the first preset quantity having minimum similarities as the first terminals.

5. The method according to claim 1, wherein the step of, according to the beamforming-weight-amplitude factors of the second terminals, allocating the transmission powers to the second terminals comprises:

performing interference suppression to the second terminals, to obtain beamforming weights of the second terminals;

multiplying the beamforming weights of the second terminals by the beamforming-weight-amplitude factors of the second terminals, to obtain final beamforming weights of the second terminals;

by using the final beamforming weights of the second terminals, calculating out target transmission powers of the second terminals; and adjusting current transmission powers of the second terminals to the target transmission powers.

6. The method according to claim 5, wherein the step of adjusting the current transmission powers of the second terminals to the target transmission powers comprises:

acquiring a maximum-power channel that has a maximum transmission power in the target transmission powers of the second terminals;

judging whether a transmission power of the maximum-power channel exceeds a channel-transmission-power upper limit;

if yes, reducing the transmission powers of all of the channels of the second terminals at an equal proportion, till the transmission power of the maximum-power channel is not greater than the channel-transmission-power upper limit, and, simultaneously, reducing the maximum capacity of the power pool by a step length; and if no, increasing the maximum capacity of the power pool by a step length.

7. A Non-Transitory computer-readable medium stores a computer program wherein the computer program comprises a computer-readable code, and when the computer-readable code is executed on a calculating and processing device, the computer-readable code causes the calculating and processing device to implement the method for allocating transmission powers according to claim 1.

8. A device for allocating transmission powers, the device being applied to a base station, wherein the device comprises:

an acquiring module configured for acquiring channel data of terminals that are connected to the base station;

a virtual-pre-dispatching module configured for, according to the channel data of the terminals, from the terminals, virtually pre-dispatching first terminals of a first preset quantity;

an interference-suppression module configured for performing interference suppression to the first terminals, to obtain beamforming-weight-amplitude factors of the first terminals;

a dispatching module configured for dispatching second terminals of a second preset quantity from the first terminals, and, from the beamforming-weight-amplitude factors of the first terminals, screening out beamforming-weight-amplitude factors of the second terminals; and a transmission-power allocating module configured for, according to the beamforming-weight-amplitude factors of the second terminals, allocating transmission powers to the second terminals.

9. The device according to claim 8, wherein the base station is provided with a power pool; and the interference-suppression module comprises:

a first beamforming-weight acquiring submodule configured for performing interference suppression to the first terminals, to obtain beamforming weights of the first terminals;

a pre-allocated-power calculating submodule configured for, by using the beamforming weights of the first terminals, calculating out a pre-allocated power of the first terminals; and a beamforming-weight-amplitude-factor calculating submodule configured for, based on the pre-allocated powers of the first terminals and a maximum capacity of the power pool, calculating out the beamforming-weight-amplitude factors of the first terminals.

10. The device according to claim 9, wherein the pre-allocated-power calculating submodule comprises:

a calculating unit configured for, by using the beamforming weights of the first terminals, calculating out a first power difference between the first terminals and a preset spectrum-efficiency upper limit and a second power difference between the first terminals and a preset beamforming-gain upper limit;

a first determining unit configured for, if the first power difference is greater than the second power difference, using the second power difference as the pre-allocated power of the first terminals;

a second determining unit configured for, if the first power difference is less than the second power difference, using the first power difference as the pre-allocated power of the first terminals; and a third determining unit configured for, if the first power difference is equal to the second power difference, using the first power difference or the second power difference as the pre-allocated power of the first terminals.

11. The device according to claim 8, wherein the virtual-pre-dispatching module comprises:

a similarity calculating submodule configured for calculating similarities of the channel data of the terminals; and a first-terminal determining submodule configured for acquiring terminals of the first preset quantity having minimum similarities as the first terminals.

12. The device according to claim 8, wherein the transmission-power allocating module comprises:

a second beamforming-weight acquiring submodule configured for performing interference suppression to the second terminals, to obtain beamforming weights of the second terminals;

a third beamforming-weight acquiring submodule configured for multiplying the beamforming weights of the second terminals by the beamforming-weight-amplitude factors of the second terminals, to obtain final beamforming weights of the second terminals;

a transmission-power calculating submodule configured for, by using the final beamforming weights of the second terminals, calculating out target transmission powers of the second terminals; and a transmission-power adjusting submodule configured for adjusting current transmission powers of the second terminals to the target transmission powers.

13. The device according to claim 12, wherein the transmission-power adjusting submodule comprises:

a maximum-power-channel acquiring unit configured for acquiring a maximum-power channel that has a maximum transmission power in the target transmission powers of the second terminals;

a channel-transmission-power-upper-limit judging unit configured for judging whether a transmission power of the maximum-power channel exceeds a channel-transmission-power upper limit;

a first power-pool-capacity adjusting module configured for reducing the transmission powers of all of the channels of the second terminals at an equal proportion, till the transmission power of the maximum-power channel is not greater than the channel-transmission-power upper limit, and, simultaneously, reducing the maximum capacity of the power pool by a step length; and a second power-pool-capacity adjusting module configured for increasing the maximum capacity of the power pool by a step length.

* * * * *